United States Patent
Xu et al.

(10) Patent No.: US 11,081,067 B2
(45) Date of Patent: Aug. 3, 2021

(54) DISPLAY SUBSTRATE OF ELECTRONIC INK SCREEN AND DISPLAY DEVICE THEREOF

(71) Applicants: Beijing BOE Optoelectronics Technology Co., Ltd., Beijing (CN); BOE Technology Group Co., Ltd., Beijing (CN)

(72) Inventors: Rui Xu, Beijing (CN); Chao Tian, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/660,869

(22) Filed: Oct. 23, 2019

(65) Prior Publication Data

US 2020/0126496 A1 Apr. 23, 2020

(30) Foreign Application Priority Data

Oct. 23, 2018 (CN) .......................... 201821729499.X

(51) Int. Cl.
| | |
|---|---|
| *G09G 3/34* | (2006.01) |
| *G09G 3/00* | (2006.01) |
| *G02F 1/16766* | (2019.01) |
| *G02F 1/167* | (2019.01) |

(52) U.S. Cl.
CPC .......... *G09G 3/3446* (2013.01); *G02F 1/167* (2013.01); *G02F 1/16766* (2019.01); *G09G 3/002* (2013.01); *G09G 2300/06* (2013.01)

(58) Field of Classification Search
CPC ...... G09G 3/3446; G09G 3/344; G09G 3/002; G09G 2330/028; G09G 2300/06; G09G 2300/08; G02F 1/13306; G02F 1/16766; G02F 1/167; G02F 1/1677; G02F 2001/13312
See application file for complete search history.

(56) References Cited

U.S. PATENT DOCUMENTS

| | | | | |
|---|---|---|---|---|
| 2008/0121819 A1* | 5/2008 | Tanaka | ................... | G03F 7/7085 250/492.2 |
| 2008/0158217 A1* | 7/2008 | Hata | .................... | G09G 3/2096 345/211 |
| 2011/0148835 A1* | 6/2011 | Yamazaki | ............ | G09G 3/3413 345/207 |
| 2013/0000690 A1* | 1/2013 | Liu | ..................... | H01L 31/0687 136/244 |

* cited by examiner

*Primary Examiner* — Christopher E Leiby
(74) *Attorney, Agent, or Firm* — Fay Sharpe LLP

(57) ABSTRACT

A display substrate of an electronic ink screen and a display device thereof are disclosed. The display substrate of the electronic ink screen includes: a base substrate having a display region and a non-display region; a display structure disposed in the display region of the base substrate; and a photoelectric conversion device disposed in the non-display region of the base substrate, wherein the photoelectric conversion device is connected to a driving circuit of the electronic ink screen and is configured to convert an optical signal of ambient light of the electronic ink screen to an electrical signal so as to supply power to the driving circuit.

20 Claims, 16 Drawing Sheets

DISPLAY SUBSTRATE OF ELECTRONIC INK SCREEN AND DISPLAY DEVICE THEREOF

This application claims priority to Chinese Patent Application No. 201821729499.X, filed on Oct. 23, 2018 and entitled "DISPLAY SUBSTRATE OF ELECTRONIC INK SCREEN AND DISPLAY DEVICE THEREOF", the entire contents of which are incorporated herein by reference.

TECHNICAL FIELD

The present disclosure relates to the field of display technologies, and in particular, to a display substrate of an electronic ink screen and a display device thereof.

BACKGROUND

With the development of science and technology, more and more types of display screens are available. An electronic ink screen is proposed currently. The electronic ink screen is also called an electrophoretic paper display (EPD) screen, or an electrophoretic display screen.

The electronic ink screen includes an EPD substrate and an EPD cover plate arranged on the EPD substrate, and the electronic ink screen is connected to a driving circuit thereof and is capable of displaying an image under driving of the driving circuit. The existing electronic ink screen is a bi-stable display screen, when the image on the display screen is statically displayed, the driving circuit does not consume power; and when the image on the display screen is refreshed, the driving circuit consumes a large amount of power.

SUMMARY

Embodiments of the present disclosure provide a display substrate of an electronic ink screen and a display device thereof. The technical solutions are as follows:

In a first aspect, a display substrate of an electronic ink screen is provided. The display substrate includes:

a base substrate having a display region and a non-display region;

a display structure disposed in the display region of the base substrate; and a photoelectric conversion device disposed in the non-display region of the base substrate, wherein the photoelectric conversion device is connected to a driving circuit of the electronic ink screen and is configured to convert an optical signal of ambient light to an electrical signal so as to supply power to the driving circuit of the electronic ink screen.

Optionally, the photoelectric conversion device includes at least one photodiode connected to the driving circuit.

Optionally, the at least one photodiode is arranged on at least one side of the display region.

Optionally, the photodiode is a p-i-n junction photodiode and the p-i-n junction photodiode includes a first electrode layer, a p-i-n junction and a second electrode layer.

Optionally, the first electrode layer, the p-i-n junction and the second electrode layer are sequentially arranged in a direction distal from the base substrate.

Optionally, the display structure includes a first gate, a first source, a first drain, and a first transparent pixel electrode; wherein the first electrode layer, the first source and the first drain are disposed on the same layer and are made of the same material; and the second electrode layer and the first pixel electrode are disposed on the same layer and are made of the same material.

Optionally, the display substrate further includes:

a switch unit disposed in the non-display region of the base substrate, wherein the photoelectric conversion device is connected to an electrical signal input terminal of the switch unit, an electrical signal output terminal of the switch unit is connected to an electrical signal input terminal of the driving circuit, and the switch unit is configured to transmit an electrical signal generated by the photoelectric conversion device to the electrical signal input terminal of the driving circuit when being turned on.

Optionally, the display substrate further includes:

a storage battery disposed in the non-display region of the base substrate, wherein the electrical signal output terminal of the switch unit is connected to an electrical signal input terminal of the storage battery, and an electrical signal output terminal of the storage battery is connected to the electrical signal input terminal of the driving circuit.

Optionally, the photoelectric conversion device includes a plurality of photodiodes; and the display substrate includes one switch unit, wherein the plurality of photodiodes are connected in series and connected to the switch unit.

Optionally, the photoelectric conversion device includes a plurality of photodiodes; and the display substrate includes one switch unit, wherein the plurality of photodiodes are connected in parallel and connected to the switch unit.

Optionally, the photoelectric conversion device includes a plurality of photodiodes; and the display substrate includes a plurality of switch units, wherein the plurality of switch units are connected to the plurality of photodiodes respectively.

Optionally, the switch unit includes a thin film transistor (TFT) having a second source and a second drain; wherein the second source of the switch unit is connected to an electrical signal output terminal of the photodiode, and the second drain is connected to electrical signal input terminal of the driving circuit; and the display substrate further includes a gate line connected to a second gate, wherein the gate line is configured to input a switch control signal for the second gate.

Optionally, the display substrate further includes a photoelectric conversion device conducting-wire layer disposed on the side, distal from the base substrate, of the photoelectric conversion device; and the photoelectric conversion device includes a plurality of photodiodes;

the photoelectric conversion device conducting-wire layer includes a plurality of conducting wires and a light-shielding block, wherein the plurality of conducting wires are connected to the plurality of photodiodes in a one-to-one corresponding fashion, and an orthographic projection of the light-shielding block on the base substrate at least partially overlaps an orthographic projection of the switch unit on the base substrate.

Optionally, the display substrate further includes a light intensity sensor configured to detect the intensity of ambient light.

Optionally, the light intensity sensor is integrated in the photoelectric conversion device.

Optionally, the photoelectric conversion device includes a plurality of photodiodes which are connected to the driving circuit and arranged on at least one side of the display region;

the photodiode is a p-i-n junction photodiode which includes a first electrode layer, a p-i-n junction and a second electrode layer, wherein the first electrode layer, the p-i-n junction and the second electrode layer are sequentially arranged in a direction distal from the base substrate; and the display structure includes a first gate, a first source, a first drain, and a first transparent pixel electrode, wherein the first electrode layer, the first source and the first drain are disposed on the same layer and are made of the same material, and the second electrode layer and the first pixel electrode are disposed on the same layer and are made of the same material;

the switch unit includes a thin film transistor (TFT) having a second source and a second drain, wherein the second source is connected to the photoelectric conversion device, and the second drain is connected to the driving circuit;

the display substrate further includes a photoelectric conversion device conducting-wire layer disposed on the side, distal from the base substrate, of the photoelectric conversion device; and the photoelectric conversion device conducting-wire layer includes a plurality of conducting wires and a light-shielding block, wherein the plurality of conducting wires are connected to the plurality of photodiodes in a one-to-one corresponding fashion, and an orthographic projection of the light-shielding block on the base substrate at least partially overlaps an orthographic projection of the switch unit on the base substrate;

the display substrate further includes a light intensity sensor integrated into the photoelectric conversion device, wherein the light intensity sensor is configured to detect the intensity of ambient light; and the display substrate satisfies any one of the following conditions:

the display substrate includes one switch unit, and the plurality of photodiodes are connected in series and connected to the switch unit;

the display substrate includes one switch unit, and the plurality of photodiodes are connected in parallel and connected to the switch unit; and the display substrate includes a plurality of switch units, and the plurality of switch units are connected to the plurality of photodiodes respectively.

In a second aspect, a display device is provided. The display device includes an electronic ink screen, and a driving circuit of the electronic ink screen, wherein the electronic ink screen includes the display substrate in the first aspect.

Optionally, the display device further includes a housing disposed outside the electronic ink screen, wherein the housing includes an opening region, the display region of the electronic ink screen is exposed from the opening, and a region, which covers the non-display region of the electronic ink screen, in the housing is light transmissive.

Optionally, the display device is an electronic price tag.

DETAILED DESCRIPTION

For clearer descriptions of the principles, technical solutions and advantages in the embodiments of the present disclosure, the present disclosure is described in detail hereinafter in combination with the accompanying drawings. Apparently, the described embodiments are merely some exemplarily embodiments, rather than all embodiments, of the present disclosure. Based on the embodiments of the present disclosure, all other embodiments derived by a person of ordinary skill in the art without creative efforts shall fall within the protection scope of the present disclosure.

A display device is usually small in size, such as an electronic price tag, and may include a housing, an electronic ink screen, a driving circuit, a battery, and the like. Since the driving circuit is power supplied by the battery, when the battery is exhausted, the battery needs to be replaced or the display device needs to be discarded. Therefore, the use cost of the display device having the electronic ink screen is relatively higher.

For example, the display device is an electronic price tag. The electronic price tag may include an electronic ink screen, a battery, a driving circuit and a housing. The battery is usually a non-rechargeable lithium battery. The lithium battery supplies power to the driving circuit. When the lithium battery is exhausted, the electronic price tag is usually discarded.

Figure 1:
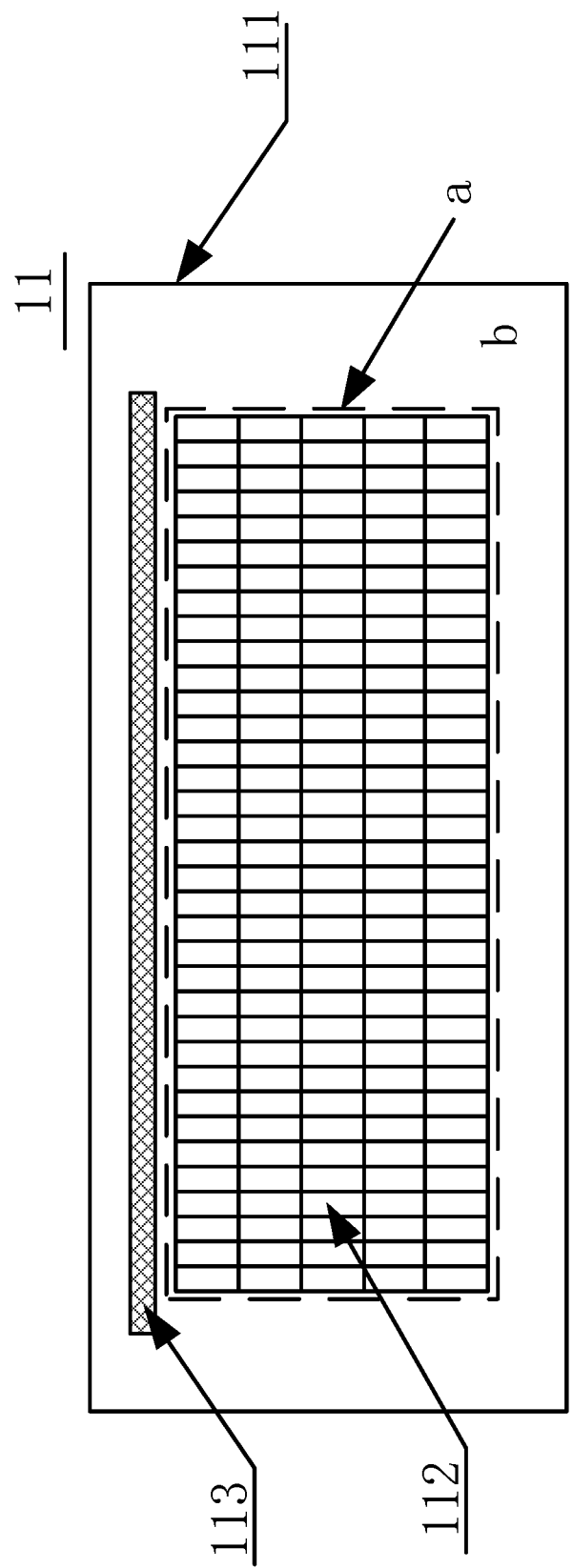
FIG. 1 is a structural diagram of a display substrate of an electronic ink screen according to one exemplary embodiment of the present disclosure.

As shown in FIG. 1, an embodiment of the present disclosure provides a display substrate 11 of an electronic ink screen, which may solve the above technical problem. The display substrate 11 may include the following structures:

a base substrate 111 having a display region a and a non-display region b, wherein the non-display region b is arranged around the display region a, the non-display region b is a ring-shaped region; for example, when the display region a is a rectangular region, the non-display region b is a square ring-shaped region, and when the display region a is a circular region, the non-display region b is a circular ring-shaped region; and exemplarily, the base substrate 111 may be a glass substrate, a flexible polyethylene terephthalate (PET) substrate (which is also called a flexible plastic substrate), or a polyimide (PI) substrate, which is not limited in the embodiment of the present disclosure;

a display structure 112 disposed in the display region a of the base substrate 111; and a photoelectric conversion device 113 disposed in the non-display region b of the base substrate 111, wherein the photoelectric conversion device 113 is electrically connected to a driving circuit (not shown in FIG. 1) of the display structure 112, and the photoelectric conversion device 113 is configured to convert an optical signal of ambient light of the electronic ink screen to an electrical signal so as to supply power to the driving circuit of the electronic ink screen.

Exemplarily, a material for converting the optical signal to the electrical signal in the photoelectric conversion device 113 may be a monocrystalline silicon material, a polysilicon material, an amorphous silicon material or the like, which is not limited in the embodiment of the present disclosure.

In summary, in the display substrate of the electronic ink screen according to the embodiment of the present disclosure, the photoelectric conversion device is added to the display substrate of the electronic ink screen and the photoelectric conversion device may convert the optical signal of ambient light, which is irradiated onto the electronic ink screen, to the electrical signal, thereby supplying power to the driving circuit of the electronic ink screen. Therefore, the function of the electronic ink screen is enriched.

Figure 2:
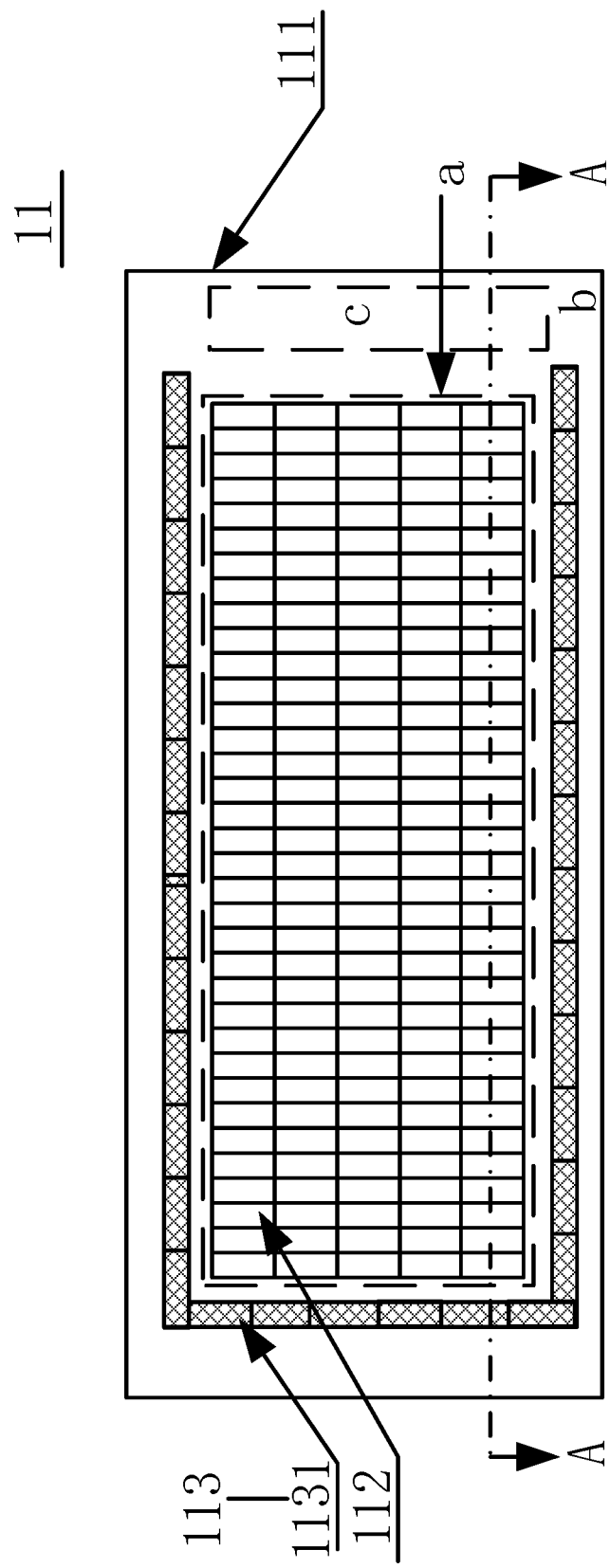
FIG. 2 is a structural diagram of a display substrate of an electronic ink screen according to one exemplary embodiment of the present disclosure.

Optionally, as shown in FIG. 2, the photoelectric conversion device 113 includes a plurality of photodiodes 1131 (or the photoelectric conversion device includes one photodiode). The plurality of photodiodes 1131 are arranged on at least one side of the display region a. Exemplarily, the plurality of photodiodes 1131 may be uniformly arranged on the same side of the display region a so as to receive a uniform optical signal. For example, the display substrate 11 may include a plurality of display structures 112 (which may also be called pixel structures) arranged in an array. The plurality of photodiodes 1131 may be equidistantly arranged in the non-display region b along a row direction and/or a column direction of the display structure 112 in the base substrate 111.

Exemplarily, the plurality of photodiodes 1131 may be arranged in the non-display region b on at least two sides of the display region a. For example, as shown in FIG. 2, the plurality of photodiodes 1131 are arranged in the non-display region b on three sides of the display region a. These three sides are other three sides, except the side where a bonding region c is disposed, in the non-display region. That is, the plurality of photodiodes are arranged in the non-display region b on an upper side, a left side and a lower side of the display region a shown in FIG. 2. The bonding region c is a side region of the display region a and is a region for connection to a flexible printed circuit (FPC). By arranging the plurality of photodiodes by avoiding the bonding region, the impact caused by the photodiode to the bonding region during photoelectric conversion may be avoided. In addition, since the photoelectric conversion device is formed by arranging the plurality of photodiodes and the plurality of photodiodes are arranged on a plurality of sides of the display region, the power generation efficiency is improved.

Figure 3:
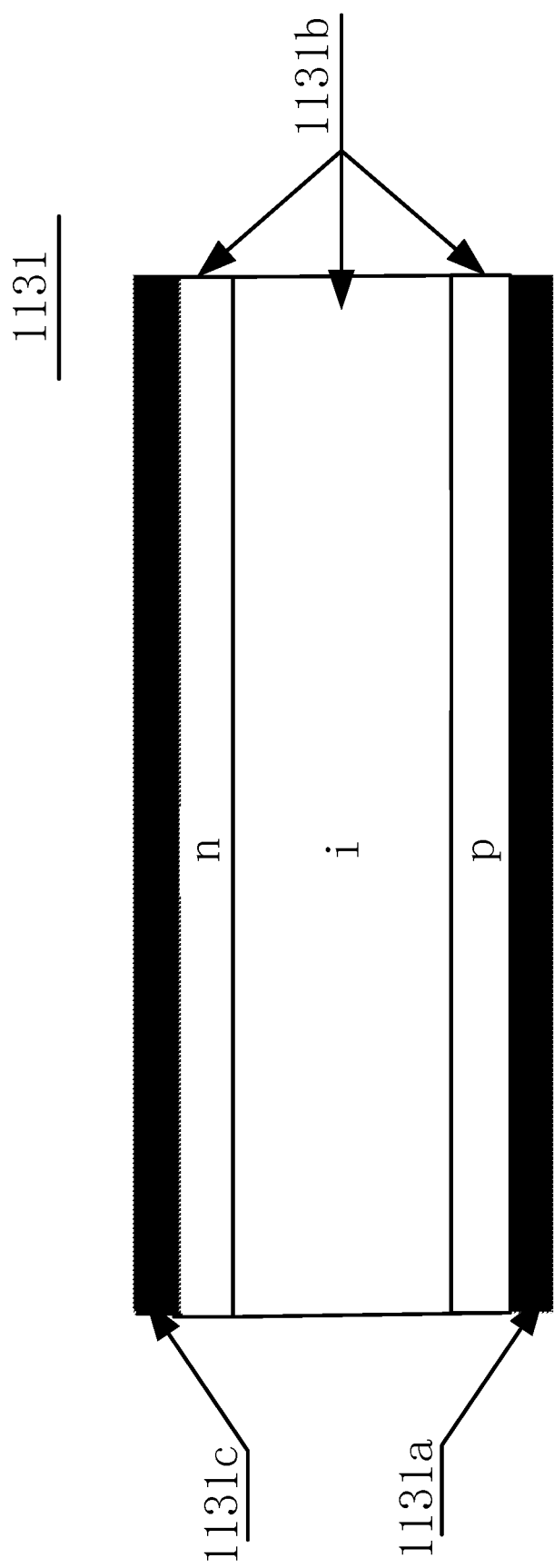
FIG. 3 is a structural diagram of a p-i-n junction photodiode according to one exemplary embodiment of the present disclosure.

Further, as shown in FIG. 3, the photodiode 1131 may be a p-i-n junction photodiode. The p-i-n junction photodiode includes a first electrode layer 1131a, a p-i-n junction 1131b and a second electrode layer 1131c. The first electrode layer 1131a and the second electrode layer 1131c are different in polarity. The p-i-n junction 1131b includes an n-type region (which is also called an n layer or an electron-type semiconductor layer), a p-type region (which is also called a p layer or a hole-type semiconductor layer), and an i-type region disposed between the n-type region and the p-type region. The i-type region is also called an intrinsic layer or an i layer. Exemplarily, the p-i-n junction is made of a semiconductor material which may be silicon, germanium or the like. Optionally, the p-type region is doped with boron (B) ions and the n-type region is doped with phosphorus (p) ions.

The p-i-n junction photodiode performs photoelectric conversion based on a photovoltaic effect and the working principle of the p-i-n junction photodiode is as follows. When light is irradiated onto the p-i-n junction of the p-i-n junction photodiode, the energy of the light excites electrons in the n-type region and holes in the p-type region of the p-i-n junction from a covalent bond, thereby generating electron-hole pairs in the p-i-n junction. A part of electrons and holes which are excited in the p-i-n junction reach a space-charge region in the p-i-n junction before being recombined (that is, after the p-i-n junction is irradiated with light, in the process that the p-i-n junction tends to be stable, a part of electrons and holes which are excited disappears because of not being captured by a "recombination center"). Under the action of an internal electric field of the space-charge region, the electrons move towards the n-type region with positive charge and the holes move towards the p-type region with negative charge. A period of time later, since the n-type region stores excess electrons with negative charge and the p-type region stores excess holes with positive charges, an electromotive force is generated on the intrinsic layer between the n-type region and the p-type region and correspondingly currents are generated. The gradual accumulation of the currents enables the p-i-n junction photodiode to have a photoelectric conversion function. In one optional implementation, the p-i-n junction photodiode also has a power storage function.

It should be noted that in the p-i-n junction photodiode of the above display substrate, the n-type region of the p-i-n junction may be distal from the base substrate or close to the base substrate relative to the p-type region of the p-i-n junction, which is not limited in the embodiment of the present disclosure. In FIG. 3, the n-type region the p-i-n junction is distal from the base substrate relative to the p-type region of the p-i-n junction. The first electrode layer, the p-i-n junction and the second electrode layer may be sequentially arranged in the direction distal from the base substrate. Nevertheless, the first electrode layer, the p-i-n junction and the second electrode layer may also be sequentially arranged in the direction parallel to the base substrate.

Figure 4:
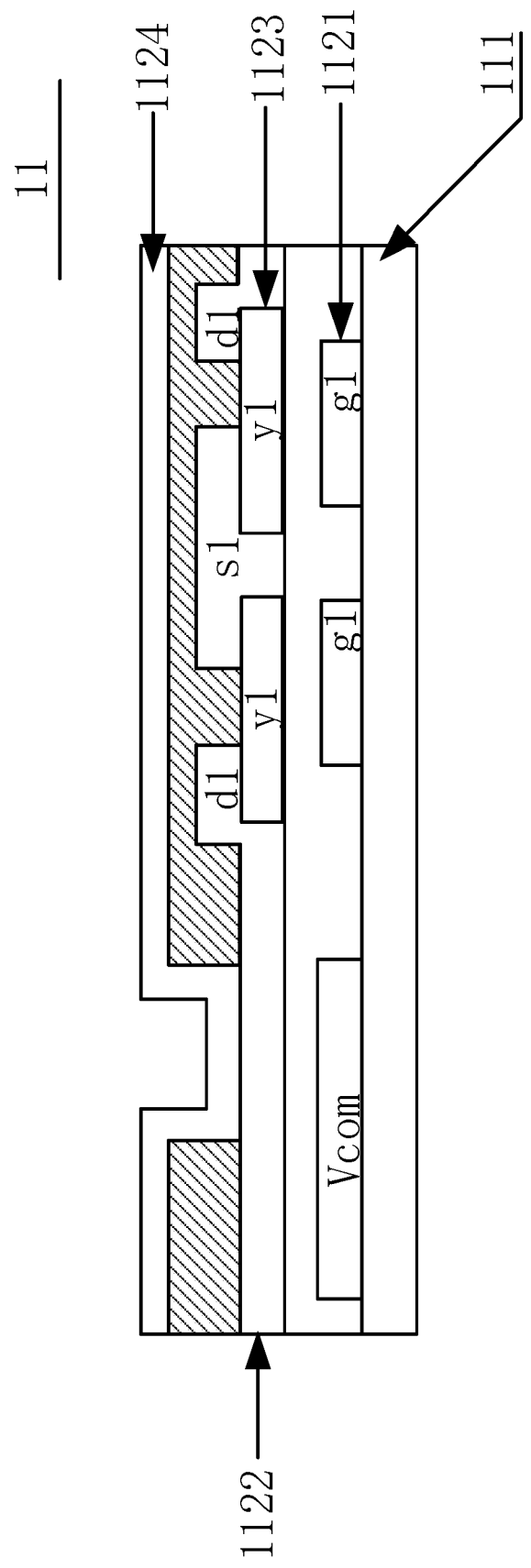
FIG. 4 is a partial sectional view of a display substrate of an electronic ink screen according to one exemplary embodiment of the present disclosure.

Optionally, as shown in FIG. 4, FIG. 4 is a partial sectional view of a display region of a section A-A in the exemplary display substrate 11 shown in FIG. 2. As shown in FIG. 4, the display structure may include: a gate pattern 1121, a source-drain pattern 1122, an active-layer pattern 1123, and a transparent electrode layer 1124. The gate pattern 1121 includes a plurality of first gates g1 (two first gates g1 are shown in FIG. 4). The source-drain pattern 1122 includes a plurality of first sources s1 and a plurality of drains d1 (two first drains d1 and two first sources s1 are shown in FIG. 4). The active-layer pattern 1123 may include a plurality of first active layers y1 (two first active layers y1 are shown in FIG. 4), and the transparent electrode layer 1124 may include a plurality of first transparent pixel electrodes (not shown in FIG. 4). Further, the gate pattern 1121 may also include a common electrode lead Vcom. Each of the first gates g1, the first active layer y1 disposed thereon, the first drain d1 and the first source s1 constitute a pixel switch. The pixel switch may be a thin film transistor (TFT).

It should be noted that the photoelectric conversion device may be formed synchronously with the display structure and may also be independently formed on the display substrate. When the photoelectric conversion device is formed synchronously with the display structure, a plurality of film layers of the two may be manufactured on the same layer. As such, the film layers on the same layer may be formed with the same patterning process. The patterning process includes photoresist coating, exposure, development, etching and photoresist stripping.

Figure 5:
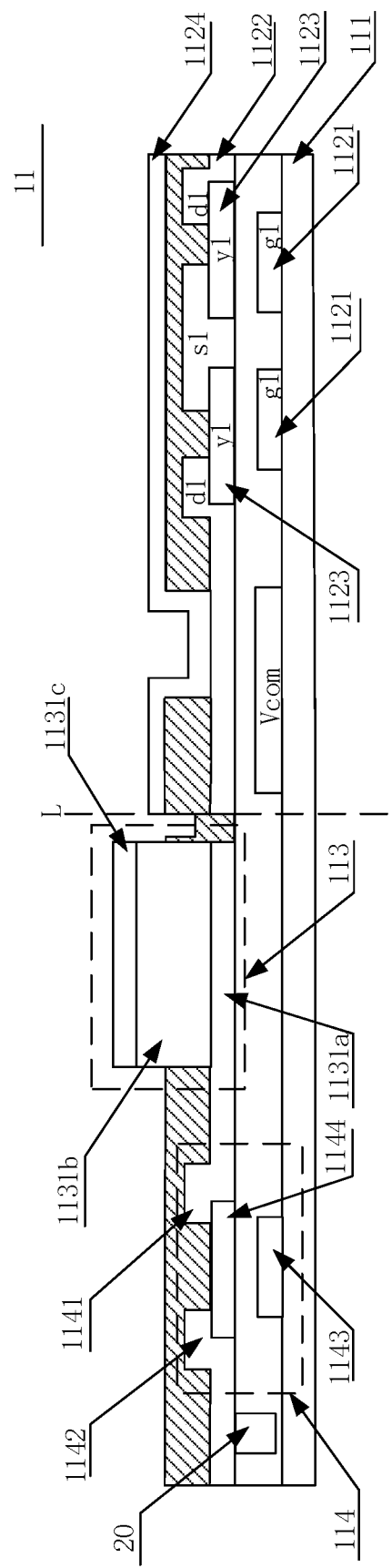
FIG. 5 is a partial sectional view of a display substrate of an electronic ink screen according to one exemplary embodiment of the present disclosure.

FIG. 5 is a partial sectional view of a section A-A in the exemplary display substrate shown in FIG. 2. The display substrate 11 also includes a switch unit 114. Optionally, the display substrate 11 may also include a storage battery 20. As shown in FIG. 5, in FIG. 5, a left side of a dashed line L is a partial non-display region of the display substrate 11 and a right side of the dashed line L is a partial display region of the display substrate 11. The first electrode layer 1131a of the photoelectric conversion device 113 and the source-drain pattern 1122 of the display structure are disposed on the same layer, made of the same material and manufactured by the same patterning process (that is, the first electrode layer 1131a, the first source s1 and the first drain d1 are disposed on the same layer). The second electrode layer 1131c of the photoelectric conversion device 113 and the transparent electrode layer 1124 of the display structure are disposed on the same layer, made of the same material and manufactured by the same patterning process (that is, the second electrode layer 1131c and the pixel electrode in the pixel electrode layer 1124 are disposed on the same layer). As such, the manufacturing process of the display substrate is simplified and the production efficiency is improved. The second electrode layer 1131c and the transparent electrode layer 1124 may be made of indium tin oxide (ITO). Since the first electrode layer 1131a and the source-drain pattern 1122 are made on the same layer, in order to avoid the mutual interference therebetween, the first electrode layer 1131a and the source-drain pattern 1122 are insulated from each other. Since the second electrode layer 1131c and the transparent electrode layer 1124 are made on the same layer, in order to avoid the mutual interference therebetween, the second electrode layer 1131c and the transparent electrode layer 1124 are insulated from each other.

In the embodiment of the present disclosure, the p-i-n junction photodiode has the power storage function. However, the p-i-n junction photodiode has a relatively lower power storage capacity and may not be able to punctually supply power to the driving circuit of the electronic ink screen. In order to ensure that the power is supplied to the electronic ink screen punctually and effectively, the display device where the display substrate is disposed may include a storage battery. As shown in FIG. 5, the switch unit 114 is connected to an electrical signal input terminal of the storage battery 20. The switch unit 114 is disposed in the non-display region of the base substrate 111 and is configured to transmit an electrical signal generated by the photoelectric conversion device 113 to the electrical signal input terminal of the storage battery 20 when being turned on. An electrical signal output terminal of the storage battery is connected to an electrical signal input terminal of the driving circuit. In one optional implementation, as shown in FIG. 5, the display substrate 11 includes the storage battery 20, and the storage battery 20 is disposed in the non-display region of the base substrate 111. As such, a line loss of the electrical signal generated by the photoelectric conversion device 113 in a transferring process may be reduced. In another optional implementation, the storage battery 20 may also be disposed outside the display substrate. Exemplarily, the storage battery 20 may be a miniature storage battery, such as a polymer lithium battery. The polymer lithium battery includes a positive pole, a negative pole and an electrolyte (this electrolyte may be wrapped with a sealing structure to prevent spilling inside the display substrate). The positive pole (i.e., the electrical signal input terminal) is connected to the switch unit 114 and the negative pole (i.e., the electrical signal output terminal) is connected to the electrical signal input terminal of the driving circuit. The miniature storage battery has the characteristics of small size and the like. Since the switch unit may control a charging time of the photoelectric conversion device to the storage battery, the charging flexibility is improved.

The switch unit may control, in a plurality of ways, a plurality of photodiodes in the photoelectric conversion device to supply power to the storage battery. The following two ways are illustrated as examples in the embodiment of the present disclosure.

In a first way, when one switch unit is arranged, the plurality of photodiodes may be connected in series and connected to the switch unit; or the plurality of photodiodes may be connected in parallel and the switch unit is arranged on a main path after parallel connection. By adopting such a way that the plurality of photodiodes are firstly connected in series or in parallel and then connected to the switch unit, the plurality of photodiodes may be controlled by only one switch unit, that is, the entire photoelectric conversion device may be controlled by only one switch unit. Thus, the production cost of the display substrate is reduced and the controlling efficiency of the switch unit is improved.

In a second way, when a plurality of switch units are arranged, the plurality of switch units may be connected to the plurality of photodiodes respectively, and a plurality of corresponding relationships may be present, such as a one-to-one corresponding relationship or a one-to-many corresponding relationship, that is, one switch unit controls a plurality of photodiodes or one switch unit controls one photodiode. In this way, the number of photodiodes that supply power to the storage battery in the plurality of photodiodes may be controlled by controlling the number of the switch units which are turned on, thereby improving the power supply flexibility.

Exemplarily, as shown in FIG. 5, the switch unit 14 is a TFT. The TFT includes a second source 1141, a second drain 1142, a second gate 1143 and a second active layer 1144. The second source 1141 is connected to an electrical signal output terminal of the photodiode, the second drain 1142 is connected to the electrical signal input terminal of the storage battery 20, and the second gate 1144 is connected to a specified gate line (not shown in FIG. 5). The gate line is configured to input a switch control signal to the second gate 1144.

It should be noted that the TFT may be manufactured synchronously with the TFT in the above display structure. For example, the second drain 1142, the second source 1141 and the source-drain pattern 1122 are disposed on the same layer and made of the same material; the second gate 1143 and the gate pattern 1121 are disposed on the same layer and made of the same material; and the second active layer 1144 and the active-layer pattern 1123 are disposed on the same layer and made of the same material. As such, the corresponding film layers of the switch unit and the pixel switch of the display substrate may be made at the same time with the same patterning process. Thus, the manufacturing process of the display substrate is simplified and the production efficiency is improved.

Figure 6:
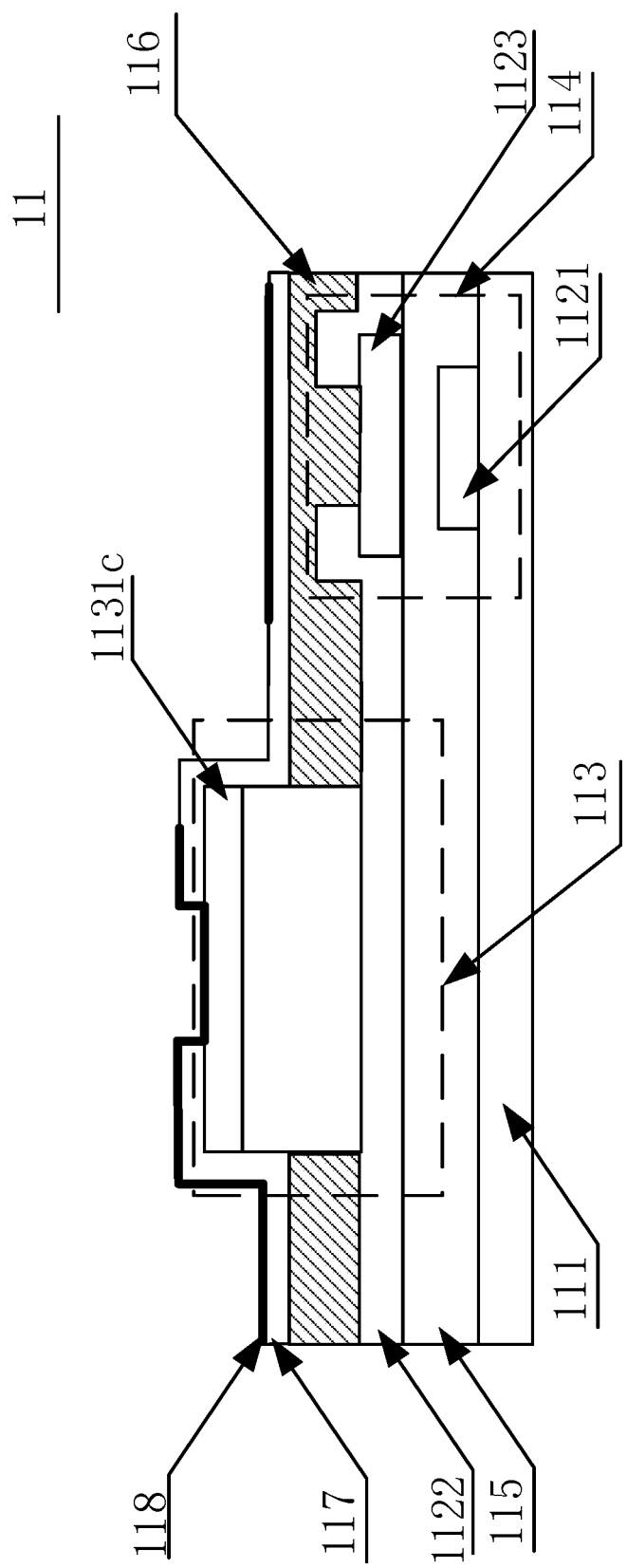
FIG. 6 is a partial sectional view of a display substrate of an electronic ink screen according to one exemplary embodiment of the present disclosure.

Optionally, FIG. 6 is a partial sectional view of a section A-A in another exemplary display substrate shown in FIG. 2. As shown in FIG. 6, the display substrate 11 further includes: a gate insulation layer 115, a source-drain insulation layer 116, a transparent electrode insulation layer 117 and a photoelectric conversion device conducting-wire layer 118. The gate pattern 1121, the gate insulation layer 115, the active-layer pattern 1123, the source-drain pattern 1122, the source-drain insulation layer 116, the transparent electrode layer (which is also called the second electrode layer 1131c of the photoelectric conversion device), the transparent electrode insulation layer 117 and the photoelectric conversion device conducting-wire layer 118 are sequentially stacked in a direction distal from the base substrate 111. The photoelectric conversion device conducting-wire layer 118 is disposed on the side, distal from the base substrate 111, of the photoelectric conversion device 113, and includes a plurality of conducting wires. The plurality of conducting wires are respectively connected to (such as connected in a one-to-one corresponding fashion) the plurality of photodiodes and are configure to provide electrical signals for the corresponding photodiodes. For example, when the photodiode is the p-i-n junction photodiode, the conducting wire is connected to the second electrode layer of the p-i-n junction photodiode.

For ease of description, the situation that the first electrode layer of the photoelectric conversion device 113 and the source-drain pattern 1122 of the display structure are disposed on the same layer and the second electrode layer 1131c of the photoelectric conversion device 113 and the transparent electrode layer of the display structure are disposed on the same layer is taken as an example in the embodiment of the present disclosure. The first electrode layer and the transparent electrode layer are not shown in FIG. 6.

It should be noted that the switch unit and the photoelectric conversion device are disposed in the same region. In order to enable the photoelectric conversion device to receive the ambient light of the electronic ink screen, this region is highly light-transmissive. As such, the ambient light may be irradiated onto the switch unit. However, when the switch unit is the TFT, the active layer in the TFT easily generates a leakage current when receiving relatively stronger light, which affects the operation of the switch unit. Therefore, a light-shielding block may be arranged on the side, distal from the base substrate, of the switch unit, and an orthographic projection of the light-shielding block on the base substrate at least partially overlaps an orthographic projection of the switch unit on the base substrate (for example, the orthographic projection of the light-shielding block on the base substrate covers the orthographic projection of the switch unit or the active layer of the switch unit on the base substrate). The light-shielding block is configured to block light from being irradiated onto the switch unit. Optionally, the photoelectric conversion device conducting-wire layer includes the light-shielding block. As such, the photoelectric conversion device conducting-wire layer may be of a light-shielding metal material by the one-time patterning process. Thus, the manufacturing process of the display substrate may be simplified. Of course, the light-shielding block may also be independently manufactured by the one-time patterning process. Exemplarily, the light-shielding metal material may be molybdenum (Mo), or may be an Al/Mo alloy.

The display device where the display substrate is disposed may control the photoelectric conversion device based on the intensity of the ambient light of the electronic ink screen. Optionally, the display substrate may be integrated with a light intensity sensor and controls the photoelectric conversion device based on the intensity of the ambient light detected by the light intensity sensor. For example, the light intensity sensor may be arranged in the display substrate. The display substrate further includes the light intensity sensor, and the light intensity sensor is configured to detect the intensity of the ambient light of the electronic ink screen.

Further, the light intensity sensor may be integrated into the photoelectric conversion device, thereby achieving functional multiplexing of the photoelectric conversion device. For example, the light intensity sensor may also be a photodiode, such as a p-i-n junction photodiode. The photoelectric conversion device includes a photodiode for generating an electrical signal, and a photodiode as a light intensity sensor.

It should be noted that the TFTs in the above embodiment of the present disclosure are illustrated as bottom-gate TFTs. In practical application, the TFTs may also be top-gate TFTs or one part of TFTs is top-gate TFTs and the other part of TFTs is bottom-gate TFTs.

In summary, in the display substrate of the electronic ink screen according to the embodiment of the present disclosure, the photoelectric conversion device is added to the display substrate of the electronic ink screen, and the photoelectric conversion device may convert the optical signal of ambient light, which is irradiated onto the electronic ink screen, to the electrical signal, thereby supplying power to the driving circuit of the electronic ink screen. Therefore, the photoelectric conversion device may achieve power supply to the electronic ink screen, thereby enriching the function of the electronic ink screen.

Figure 7:
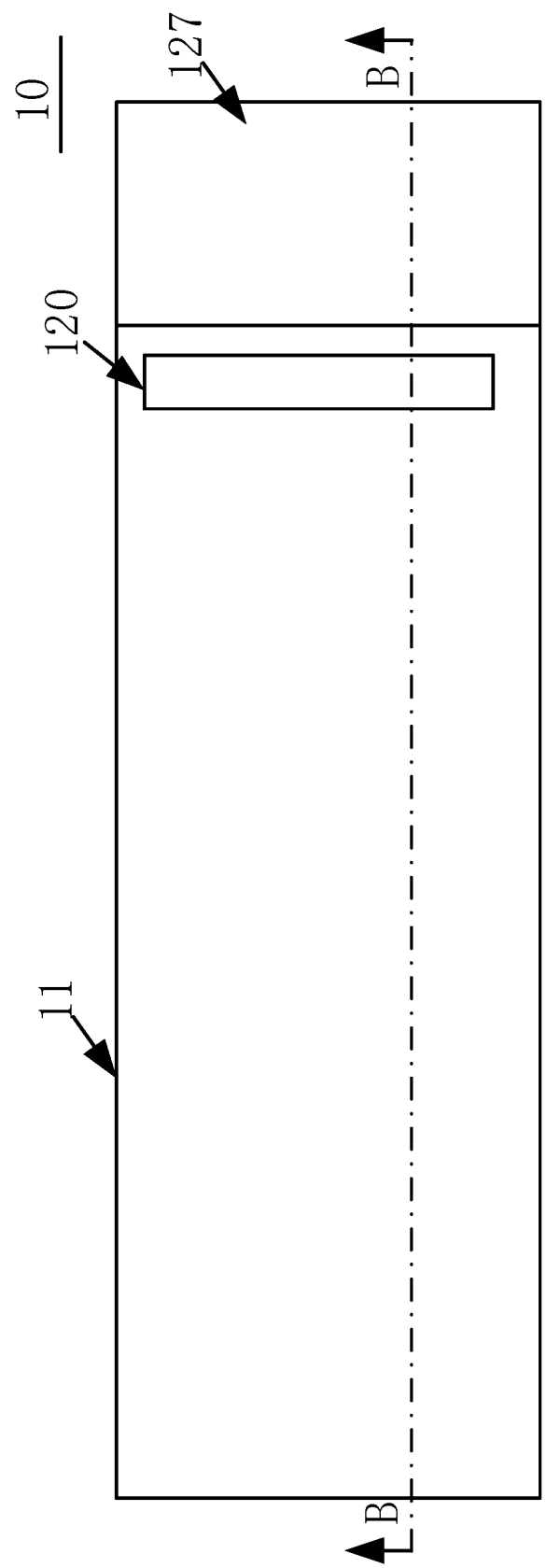
FIG. 7 is a partial structural diagram of an electronic ink screen according to one exemplary embodiment of the present disclosure.
Figure 8:
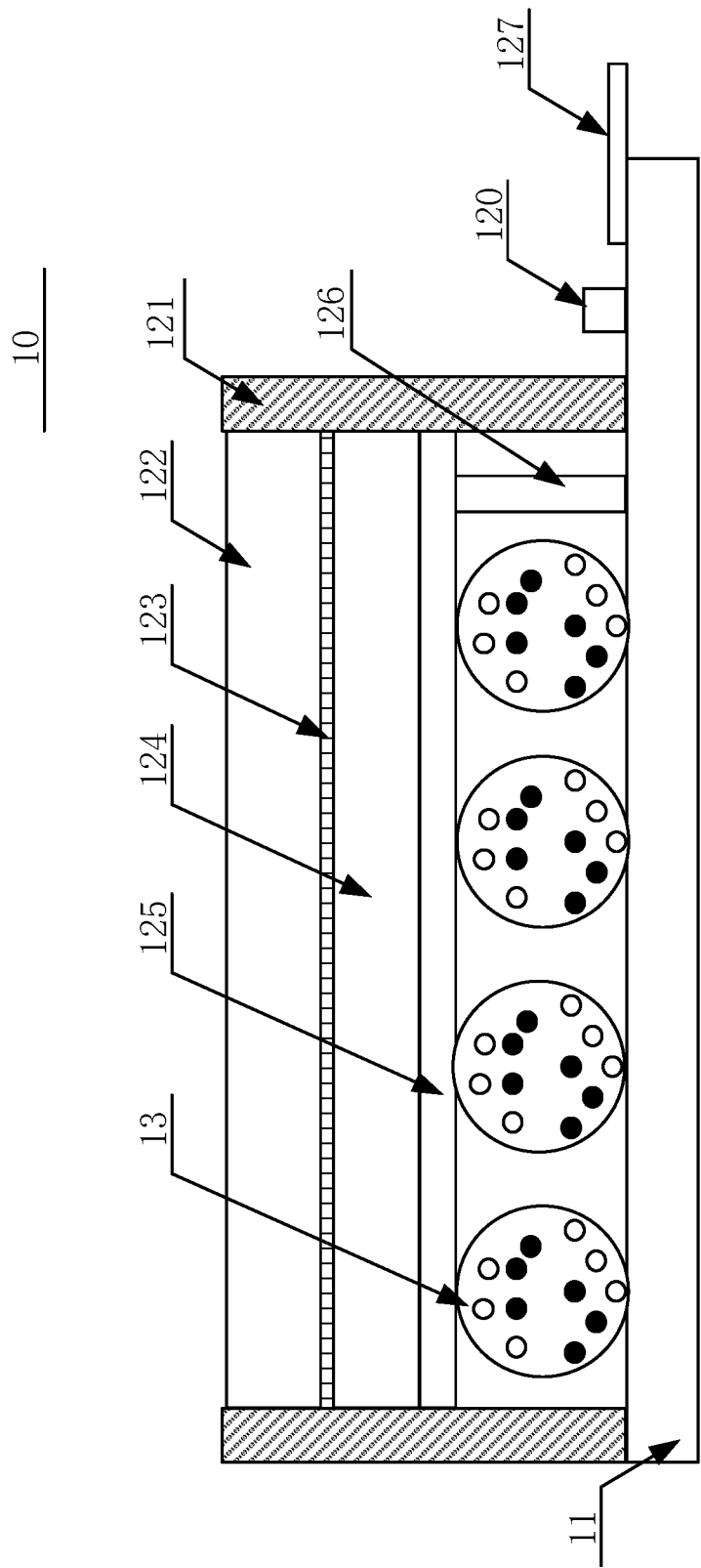
FIG. 8 is a partial sectional view of an electronic ink screen according to one exemplary embodiment of the present disclosure.

As shown in FIG. 7, the embodiment of the present disclosure provides an electronic ink screen 10. The electronic ink screen 10 may include a display substrate which is the display substrate of the above electronic ink screen 10. The electronic ink screen 10 further includes a display cover plate, and ink disposed between the display substrate and the display cover plate. Exemplarily, FIG. 8 is a partial sectional view of a section B-B in the exemplary electronic ink screen 10 shown in FIG. 7. As shown in FIG. 8, the display cover plate may include: an edge sealing adhesive (which is also called a sealant) 121, a protective film 122, an optically clear adhesive (OCA) 123, a paper film matrix 124, a conductive pedestal 125 and an Ag adhesive point 126. The Ag adhesive point 126, the conductive pedestal 125, the paper film matrix 124, the OCA 123 and the protective film 122 are sequentially stacked in the direction distal from the display substrate 11. The edge sealing adhesive 121 is ring-shaped and is configured to seal a region between the display substrate 11 and the display cover plate, prevent the ink from outflow and isolate vapour. The conductive pedestal 125 is a base on which a conductive material is formed. The conductive material may be ITO. The base may be made of glass, PT or PET. The conductive material of the conductive pedestal 125 is arranged on the side, close to the ink, of the base.

It should be noted that an integrated circuit (IC) 120, such as a gate driving circuit, may be arranged in the non-display region of the display substrate 11. The bonding region in the non-display region may be connected to a flexible printed circuit board 127. It should be noted that FIG. 7 only illustrates the display substrate 11, the integrated circuit 120 and the flexible printed circuit board 127 in FIG. 8.

A person skilled in the art may clearly understand that for the sake of convenience and conciseness in description, the specific structure of the display substrate in the electronic ink screen described above may make reference to any structure in the foregoing display substrate embodiment and is not further described here.

The embodiment of the present disclosure provides a display device. The display device may include an electronic ink screen and a driving circuit connected to the electronic ink screen. The driving circuit is configured to drive the electronic ink screen to display an image. The electronic ink screen is any of electronic ink screens according to the embodiments of the present disclosure. The photoelectric conversion device in the display substrate of the electronic ink screen may supply power to the driving circuit of the electronic ink screen of the display device. The photoelectric conversion device may supply power to the driving circuit in a plurality of ways. The following two ways are illustrated as examples in the embodiment of the present disclosure.

Figure 9:
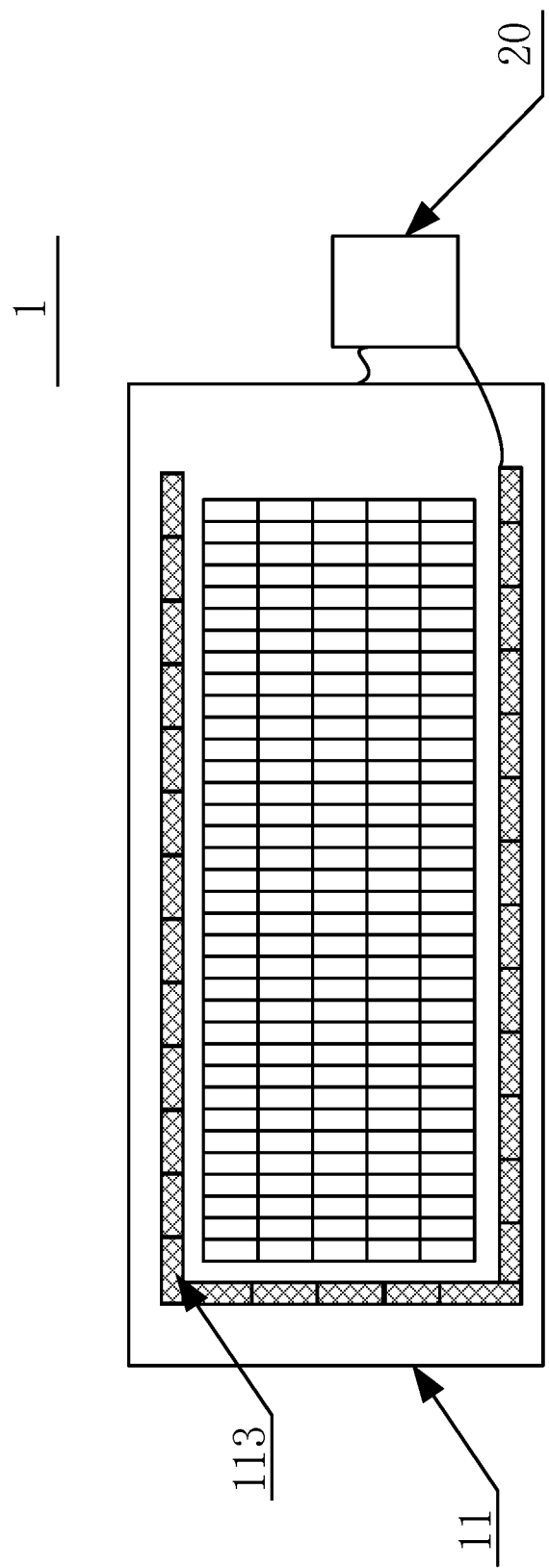
FIG. 9 is a structural diagram of a display device according to one exemplary embodiment of the present disclosure.

In a first power supply way, as shown in FIG. 9, FIG. 9 is a partial structural diagram of the display device. The display device 1 includes a storage battery 20, and the photoelectric conversion device 113 supplies power to the driving circuit with the storage battery 20.

With continued reference to FIG. 9, the storage battery 20 is electrically connected to the photoelectric conversion device 113 in the display substrate 11 of the display device 1. In addition, an electrical signal output terminal of the storage battery 20 is also connected to an electrical signal input terminal of the driving circuit of the electronic ink screen. The photoelectric conversion device 113 is configured to convert an optical signal of ambient light of the electronic ink screen to an electrical signal and transfers the electrical signal to the storage battery 20. The storage battery 20 is configured to store the electrical signal and supply power to the driving circuit. As shown in FIG. 5, the storage battery 20 may be arranged on the base substrate of the display substrate 11, that is, the storage battery is integrated in the display substrate 11; or as shown in FIG. 9, the storage battery 20 may also be arranged outside the display substrate.

In such a power supply way, since the storage battery may directly supply power to the driving circuit of the electronic ink screen, there is no need to arrange the battery in the display device in which the electronic ink screen is integrated, thereby reducing the use cost of the display device.

In order to achieve effective power supply of the storage battery to the driving circuit of the electronic ink screen, the display device may control the time when the photoelectric conversion device transfers the electric signal to the storage battery. Exemplarily, a switch unit may be arranged between the photoelectric conversion device and the storage battery, the switch unit may be a switch unit 114 as shown in FIG. 5, and the time when the photoelectric conversion device transfers the electrical signal to the storage battery may be controlled by controlling the switch unit. The following two ways are illustrated as examples in the present disclosure.

In a first way, the display device controls the switch unit based on the amount of power of the storage battery.

Figure 10:
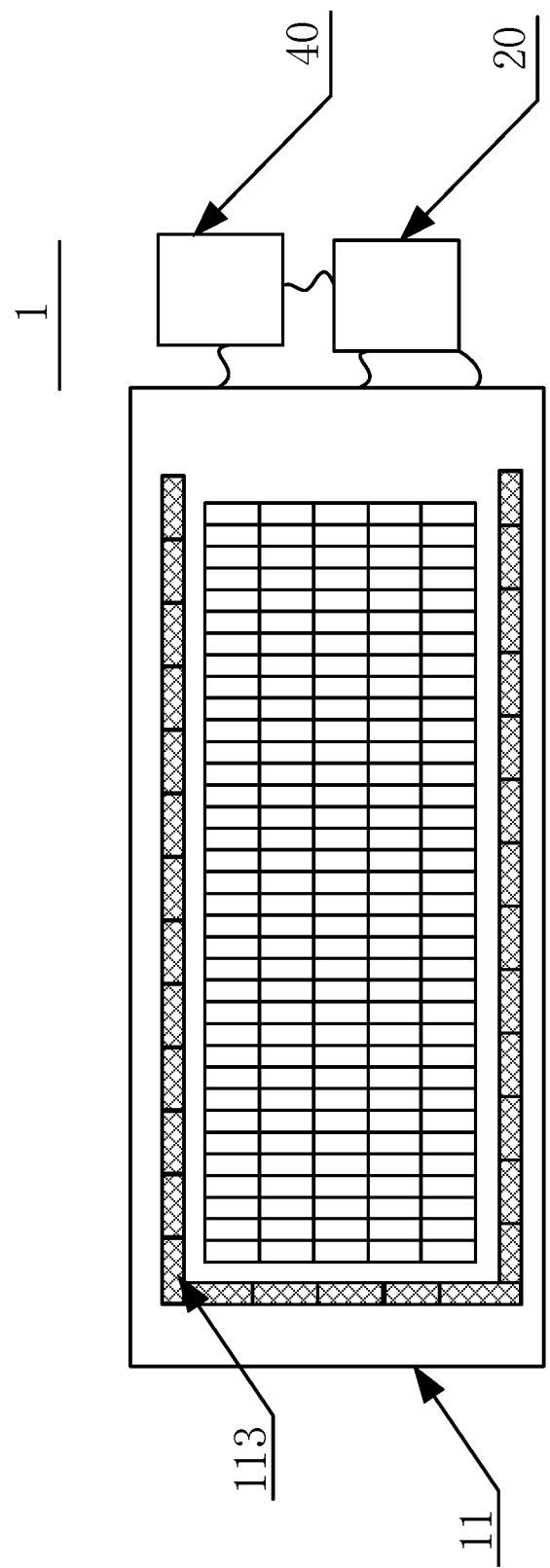
FIG. 10 is a structural diagram of a display device according to one exemplary embodiment of the present disclosure.

As shown in FIG. 10, FIG. 10 is a partial structural diagram of the display device 1. The display device 1 may include a control module 40 which is connected to the storage battery 20. The display substrate 11 includes a switch unit (not shown in the figure) connected to the photoelectric conversion device 113. The control module 40 pre-stores a first specified power amount threshold and is configured to acquire the power amount of the storage battery 20, control the switch unit to be turned on when the power amount of the storage battery 20 is less than the first specified power amount threshold, and control the switch unit to be turned off when this power amount is not less than (i.e., greater than or equal to) the first specified power amount threshold.

The situation that the storage battery is arranged outside the display substrate is illustrated as an example in FIG. 10. When the storage battery is arranged inside the display substrate, the working principle thereof may make reference to the working principle that the storage battery is arranged inside the display substrate and is not further described in the present disclosure.

In a second way, the switch unit is controlled based on the intensity of the ambient light of the electronic ink screen.

Figure 11:
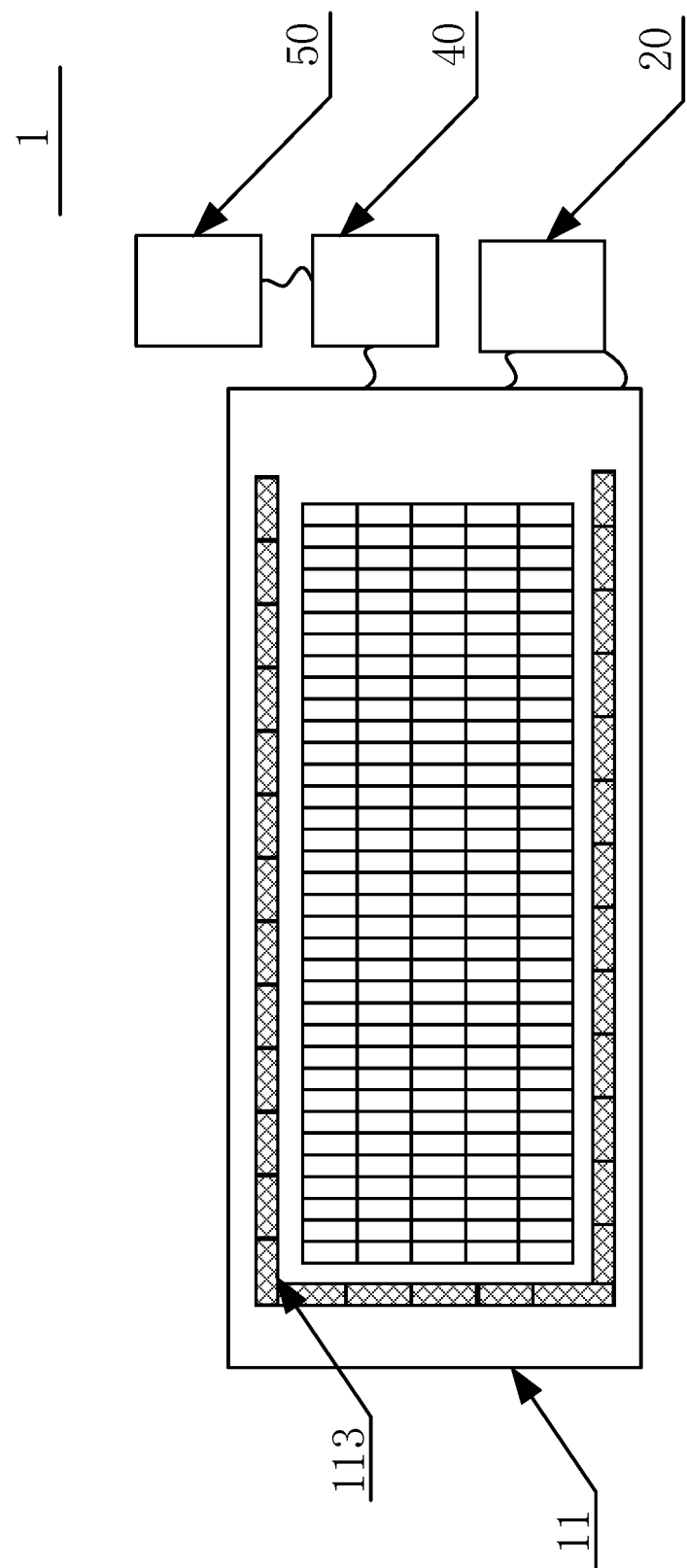
FIG. 11 is a structural diagram of a display device according to one exemplary embodiment of the present disclosure.

As shown in FIG. 11, the display device 1 may further include a control module 40 and a light intensity sensor 50. The control module 40 is connected to the light intensity sensor 50. The display substrate 11 includes a switch unit (not shown in the figure) connected to the photoelectric conversion device 113. The control module 40 pre-stores a specified intensity threshold and is configured to acquire the intensity of the ambient light of the electronic ink screen through the light intensity sensor 50, control the switch unit to be turned on when the intensity of the ambient light is greater than the specified intensity threshold and control the switch unit to be turned off when the intensity of the ambient light is not greater than the specified intensity threshold. Optionally, the intensity of light may be characterised by the brightness of the light.

The situation that the storage battery and the light intensity sensor are arranged outside the display substrate is illustrated as an example in FIG. 11. When the storage battery and/or the light intensity sensor are arranged inside the display substrate, the working principle thereof may make reference to the working principle that the storage battery and/or the light intensity sensor are arranged outside the display substrate and is not further described in the present disclosure.

Figure 12:
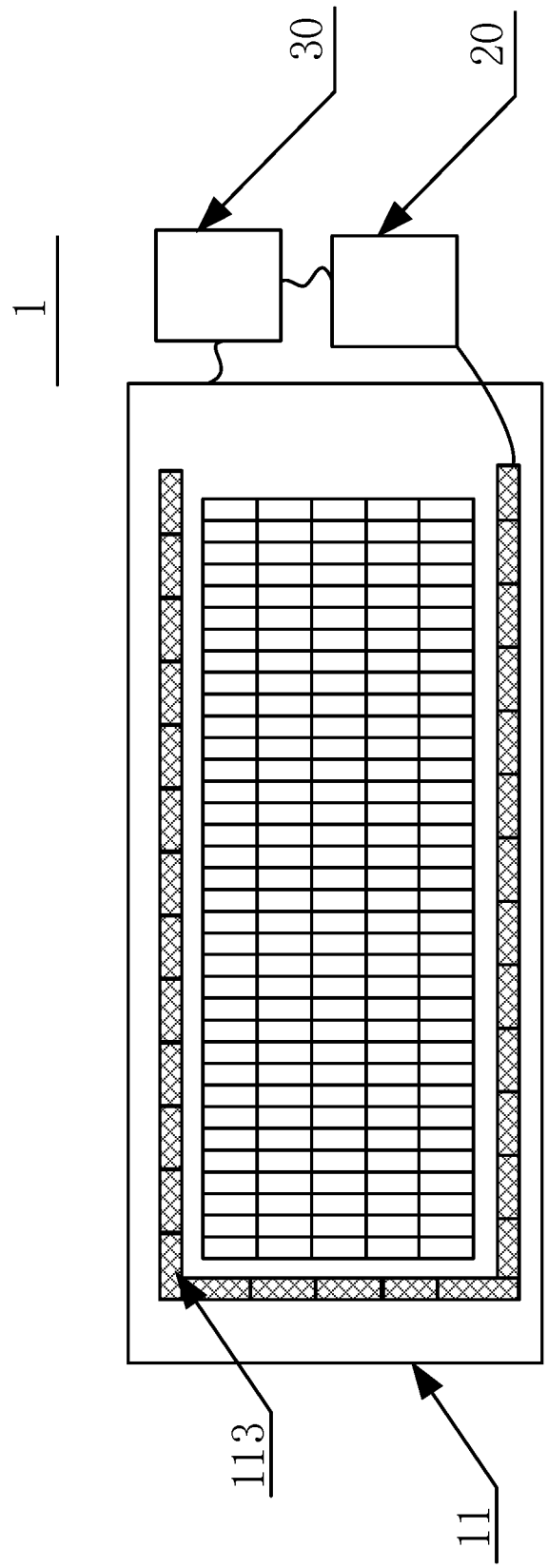
FIG. 12 is a structural diagram of a display device according to one exemplary embodiment of the present disclosure.

In a second power supply way, as shown in FIG. 12, FIG. 12 is a partial structural diagram of the display device. The display device 1 includes a storage battery 20 and a rechargeable battery 30. The photoelectric conversion device 113 supplies power to the driving circuit of the electronic ink screen with the storage battery 20 and the rechargeable battery 30.

With continued reference to FIG. 12, the storage battery 20 is electrically connected to the photoelectric conversion device 113 in the display substrate 11 of the display device 1. The rechargeable battery 30 is connected to both the electronic ink screen and the storage battery 20. The photoelectric conversion device 113 is configured to convert an optical signal of ambient light of the electronic ink screen to an electrical signal and transfers the electrical signal to the storage battery 20. The storage battery 20 is configured to store the electrical signal, and transfers the electrical signal to the rechargeable battery 30 when a specified charging condition is satisfied, and the rechargeable battery 30 supplies power to the driving circuit.

Figure 13:
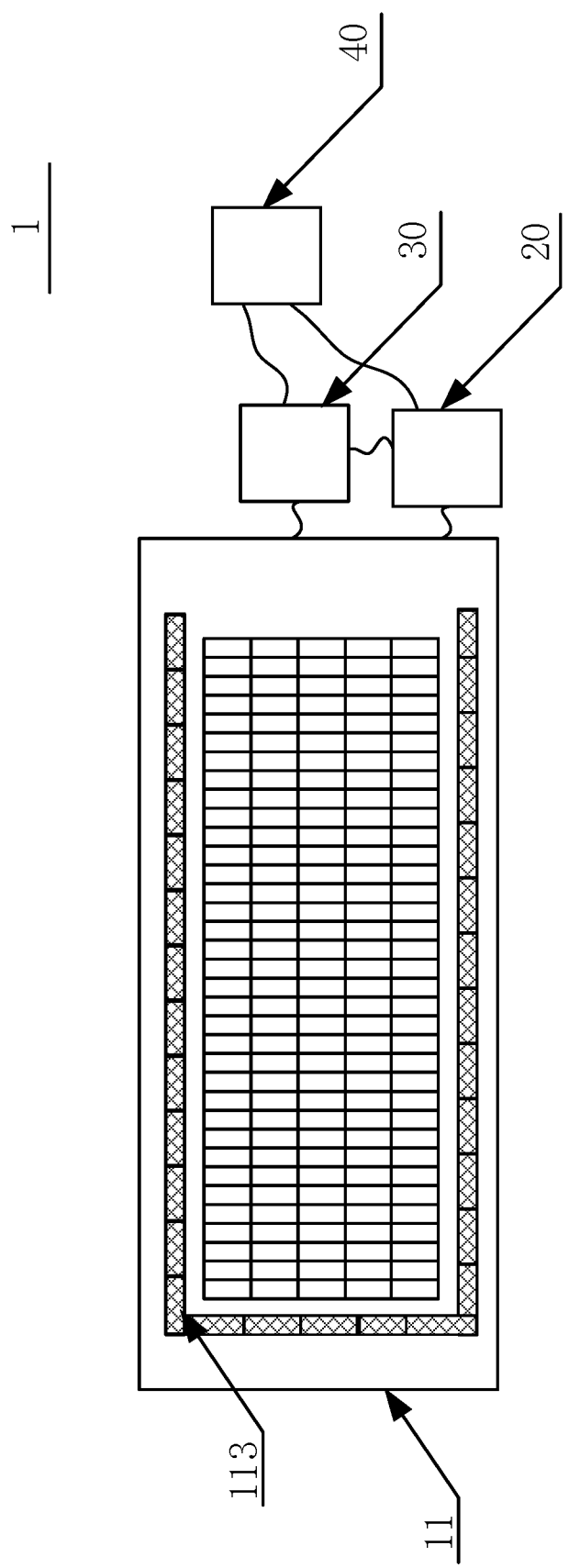
FIG. 13 is a structural diagram of a display device according to one exemplary embodiment of the present disclosure.

In order to achieve effective power supply of the rechargeable battery to the driving circuit of the electronic ink screen, the display device may control the time when the storage battery transfers the electric signal to the rechargeable battery. For example, the time when the storage battery transfers the electric signal to the rechargeable battery may be controlled by determining whether the specified charging condition is satisfied. Exemplarily, as shown in FIG. 13, the display device 1 may include a control module 40 which is connected to both the storage battery 20 and the rechargeable battery 30.

In one optional way, the control module 40 pre-stores a second specified power amount threshold, and is configured to acquire the power amount of the rechargeable battery 30; determine that the specified charging condition is satisfied when the power amount of the rechargeable battery 30 is less than the second specified power amount threshold, and control the storage battery 20 to supply power to the rechargeable battery 30; and determine that the specified charging condition is not satisfied when the power amount of the rechargeable battery 30 is not less than the second specified power amount threshold, and prohibit the storage battery 20 from supplying power to the rechargeable battery 30.

In another optional way, the control module 40 pre-stores a third specified power amount threshold, and is configured to acquire the power amount of the storage battery 20; determine that the specified charging condition is satisfied when the power amount of the storage battery 20 is greater than the third specified power amount threshold, and control the storage battery 20 to supply power to the rechargeable battery 30; and determine that the specified charging condition is not satisfied when the power amount of the storage battery 20 is not greater than the third specified power amount threshold, and prohibit the storage battery 20 from supplying power to the rechargeable battery 30.

When the display device is integrated with the rechargeable battery, the photoelectric conversion device may transfer the converted electrical signal to the storage battery, and then the storage battery supplies power to the rechargeable battery, thereby achieving auxiliary power supply of the photoelectric conversion device. In addition, since the storage battery firstly receives and stores the electrical signal transferred by the photoelectric conversion device, and then transfers the electrical signal to the rechargeable battery when the specified charging condition is satisfied, the charging and discharging of the rechargeable battery are performed at different times. Thus, the rechargeable battery is prevented from being charged and discharged synchronously, thereby prolonging the service life of the rechargeable battery and thus the service life of the display device and reducing the use cost of the display device.

It should be noted that in the second power supply way, a switch unit may also be arranged between the photoelectric conversion device and the storage battery, and the time when the photoelectric conversion device transmits the electrical signal to the storage battery may be controlled by controlling the switch unit. This control way may make reference to that of the first power supply way and is not further described in the embodiment of the present disclosure.

In the above two power supply ways, the control module may be a module in a timing controller, or a separate computation unit, such as a field-programmable gate array (FPGA).

Figure 14:
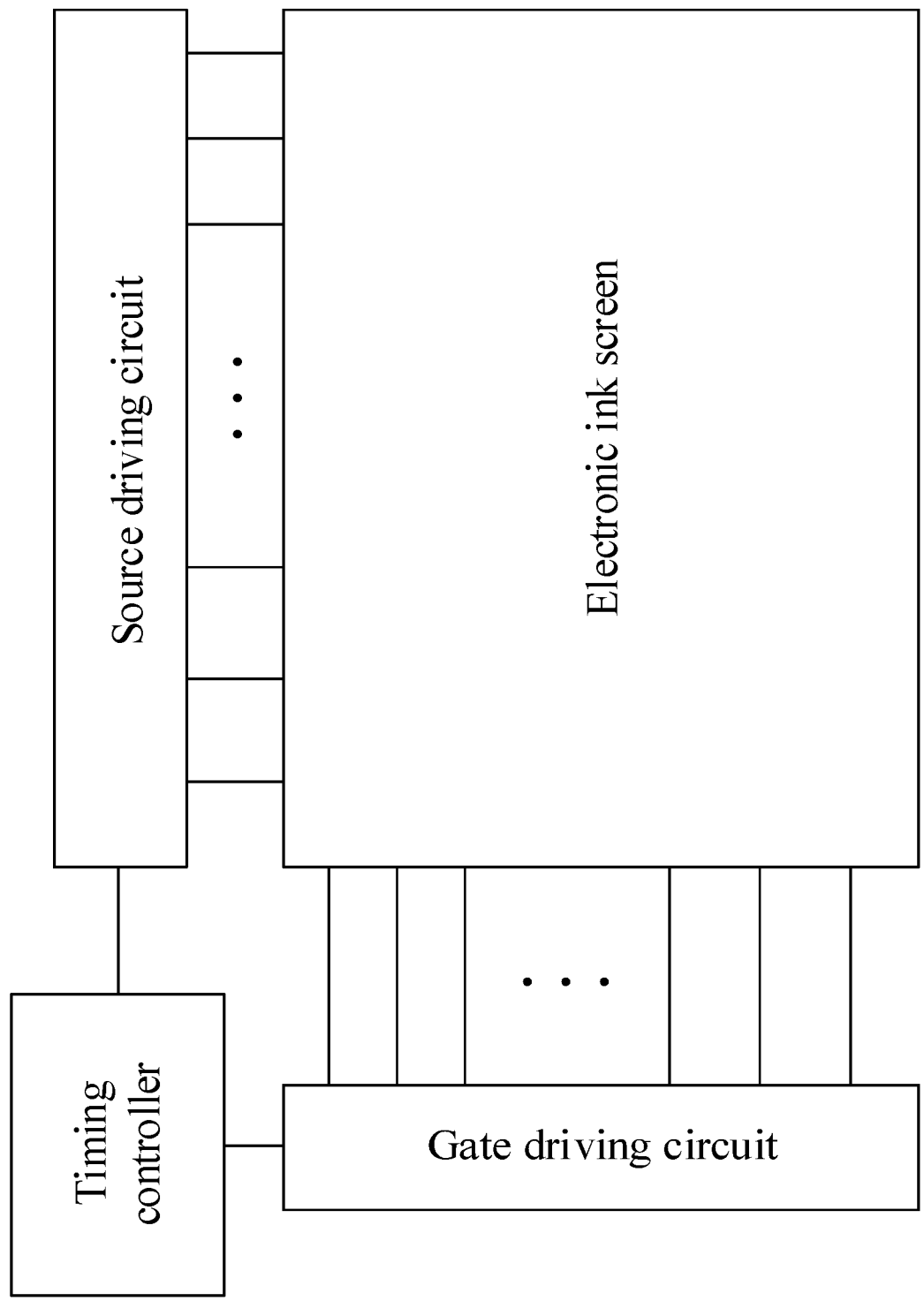
FIG. 14 is a partial structural diagram of a display device according to one exemplary embodiment of the present disclosure.

The above display device may generally include an electronic ink screen and a driving circuit for driving the electronic ink screen. With reference to FIG. 14, the driving circuit may include a timing controller, a gate driving circuit, and a source driving circuit. The gate driving circuit is configured to perform progressive scanning on each row of pixel units in the electronic ink screen; the source driving circuit is configured to provide data signals for each column of pixel units in the electronic ink screen; and the timing controller is connected to both the gate driving circuit and the source driving circuit and is configured to control signals output by the gate driving circuit and the source driving circuit. In the embodiment of the present disclosure, the power supply to the electronic ink screen is achieved by transmitting the electrical signal generated by the photoelectric conversion device to the driving circuit. Thus when the display device uses the storage battery to supply power to the electronic ink screen, the storage battery is electrically connected to the driving circuit; and when the display device uses the rechargeable battery to supply power to the electronic ink screen, the rechargeable battery is electrically connected to the driving circuit.

It should be noted that the electrical signal generated by the photoelectric conversion device may also be configured to supply power to other power-consuming devices of the display device, such as a control module, which is not limited in the embodiment of the present disclosure.

Optionally, the display device 1 further includes a housing disposed outside the electronic ink screen. The housing has an opening region, the display region a of the electronic ink screen is exposed from the opening, and a region, which covers the non-display region b of the electronic ink screen, in the housing is light-transmissive. Exemplarily, the display device 1 may be an electronic price tag, a digital photo frame, a navigator, or the like, which is not limited in the present disclosure.

It should be noted that since the display cover plate may shield the display substrate when viewed from above, in order to better illustrate the display device according to the present embodiment, the display cover plate of the electronic ink screen is not drawn in the display device shown in FIG. 9 to FIG. 13. That is, FIGS. 9-13 are structural diagrams of the display device in which the display cover plate is not arranged.

A person skilled in the art may clearly understand that for the sake of convenience and conciseness in description, the specific structure of electronic ink screen of the display device described above may make reference to any structure in the foregoing electronic ink screen embodiment and is not further described here.

In summary, in the display device according to the embodiment of the present disclosure, the photoelectric conversion device is added to the display substrate of the electronic ink screen of the display device, and the photoelectric conversion device may convert the optical signal of the ambient light, which is irradiated onto the electronic ink screen, to the electrical signal, thereby supplying power to the driving circuit of the electronic ink screen. Therefore, the photoelectric conversion device may achieve power supply to the electronic ink screen, thereby enriching the function of the electronic ink screen.

Further, since the photoelectric conversion device may achieve power supply to the driving circuit of the electronic ink screen, on the one hand, there is no need to arranged a battery in the display device integrated with the electronic ink screen, thereby reducing the use cost of the display device; and on the other hand, when the display device is integrated with the battery, the auxiliary power supply of the photoelectric conversion device may be achieved and thus the service lives of the battery and the display device are prolonged, thereby also reducing the use cost of the display device.

Figure 15:
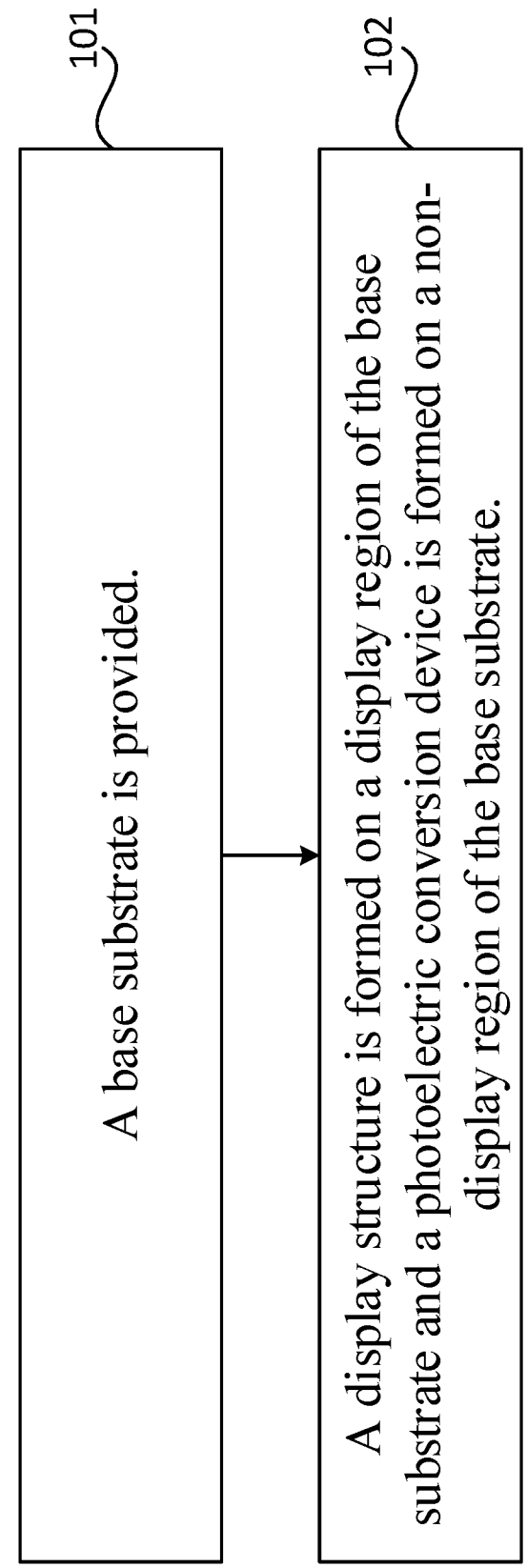
FIG. 15 is a flow chart of a manufacturing method for a display substrate of an electronic ink screen according to one exemplary embodiment of the present disclosure.

The embodiment of the present disclosure provides a manufacturing method for a display substrate of an electronic ink screen, which is used for manufacturing the display substrate according to the embodiment of the present disclosure. As shown in FIG. 15, the method includes the following steps.

In step 101, a base substrate is provided.

In step 102, a display structure is formed on a display region of the base substrate and a photoelectric conversion device is formed on a non-display region of the base substrate.

The photoelectric conversion device includes a plurality of photodiodes which are p-i-n junction photodiodes. The p-i-n junction photodiode includes a first electrode layer, a p-i-n junction and a second electrode layer.

Exemplarily, the first electrode layer of the photoelectric conversion device and a source-drain pattern of the display structure may be disposed on the same layer, made of the same material and manufactured by a one-time patterning process. The second electrode layer of the photoelectric conversion device and a transparent electrode layer of the display structure may be disposed on the same layer, made of the same material and manufactured by the one-time patterning process.

In summary, in the manufacturing method for the display substrate of the electronic ink screen according to the embodiment of the present disclosure, the photoelectric conversion device is added to the display substrate of the electronic ink screen, and the photoelectric conversion device may convert the optical signal of the ambient light, which is irradiated onto the electronic ink screen, to the electrical signal, thereby supplying power to the electronic ink screen. Therefore, the photoelectric conversion device may achieve power supply to the electronic ink screen, thereby enriching the function of the electronic ink screen.

Figure 16:
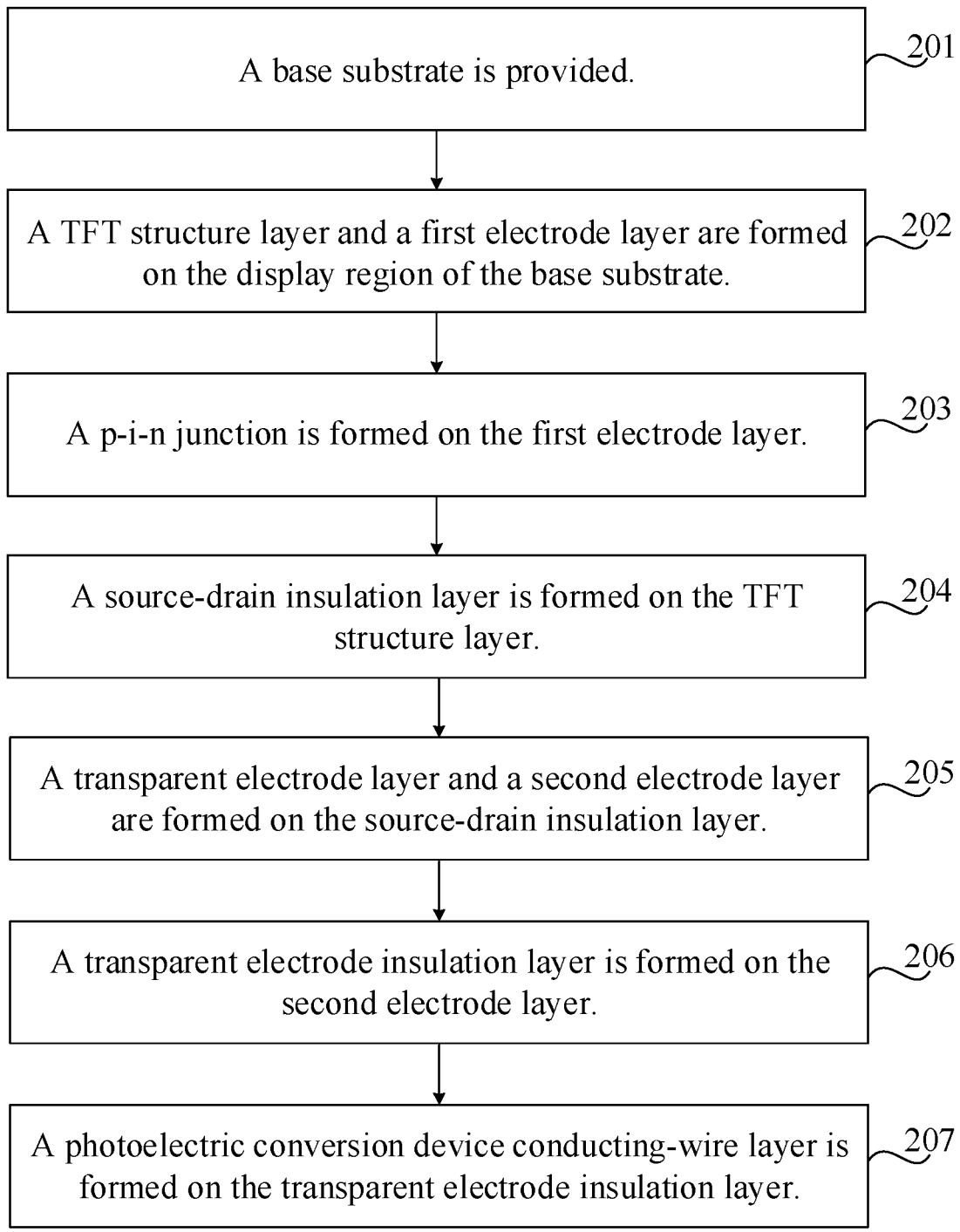
FIG. 16 is a flow chart of another manufacturing method for a display substrate of an electronic ink screen according to one exemplary embodiment of the present disclosure.

It is assumed that the display substrate of the electronic ink screen includes a switch unit which is a TFT and the photoelectric conversion device in the display substrate is a p-i-n junction photodiode, as shown in FIG. 16, the embodiment of the present disclosure provides another manufacturing method for a display substrate of an electronic ink screen, which includes the following steps.

In step 201, a base substrate is provided.

The base substrate has a display region and a non-display region, the non-display region is arranged around the display region, and the non-display region is a ring-shaped region.

In step 202, a TFT structure layer and a first electrode layer are formed on the display region of the base substrate.

The TFT structure layer includes a gate pattern, a source-drain pattern and a semiconductor active-layer pattern, which are insulated from one another.

During the manufacturing of the TFT structure layer, the gate pattern may be formed on the base substrate firstly, then a gate insulation layer is formed on the base substrate and subsequently the semiconductor active-layer pattern and the source-drain pattern are sequentially formed on the gate insulation layer.

The gate pattern includes a plurality of first gates, the source-drain pattern includes a plurality of first sources and a plurality of second drains, and the active-layer pattern may include a plurality of first active layers.

Exemplarily, a gate layer may be formed on the base substrate through deposition, coating, sputtering or the like, and then the one-time patterning process is performed on the gate layer to form the gate pattern. Subsequently, the gate insulation layer is formed through deposition, coating, sputtering or the like. Afterwards, a semiconductor active layer is formed on the base substrate, on which the gate insulation layer is formed, through deposition, coating, sputtering or the like, and then the one-time patterning process is performed on the semiconductor active layer to form the semiconductor active-layer pattern. Afterwards, a first conductive layer is formed on the gate insulation layer through deposition, coating, sputtering or the like, and then the one-time patterning process is performed on the first conductive layer to form the source-drain pattern and the first electrode layer.

The above one-time patterning process may include photoresist coating, exposure, development, etching and photoresist stripping.

It should be noted that the TFT structure layer includes both a pixel switch disposed in the display region of the base substrate and a switch unit disposed in the non-display region of the base substrate.

In step 203, a p-i-n junction is formed on the first electrode layer.

The p-i-n junction includes an n layer, a p layer and an intrinsic layer disposed between the n layer and the p layer. Exemplarily, the p layer doped with boron ions, the intrinsic layer, and the n layer doped with phosphorus ions may be sequentially formed on the first electrode layer.

In step 204, a source-drain insulation layer is formed on the TFT structure layer.

Exemplarily, the source-drain insulation layer may be formed on the TFT structure layer through deposition, coating, sputtering or the like.

In step 205, a transparent electrode layer and a second electrode layer are formed on the source-drain insulation layer.

Exemplarily, a second conductive layer may be formed on the source-drain insulation layer through deposition, coating, sputtering or the like, and then one-time patterning process is performed on the second conductive layer to form the transparent electrode layer and the second electrode layer.

In step 206, a transparent electrode insulation layer is formed on the second electrode layer.

Exemplarily, the transparent electrode insulation layer may be formed on the second electrode layer through deposition, coating, sputtering or the like.

In the embodiment of the present disclosure, the second electrode layer and the above first electrode layer are different in polarity. For example, the first electrode layer is an anode and the second electrode layer is a cathode; or the first electrode layer is the cathode and the second electrode layer is the anode.

In step 207, a photoelectric conversion device conducting-wire layer is formed on the transparent electrode insulation layer.

Exemplarily, a light-shielding metal film is formed on the transparent electrode insulation layer through deposition, coating, sputtering or the like, the photoelectric conversion device conducting-wire layer is formed through the one-time patterning process and includes a light-shielding block and a plurality of conducting wires.

It should be noted that the order of steps of the manufacturing method for the display substrate of the electronic ink screen according to the embodiments of the present disclosure may be adjusted properly and the steps may also be correspondingly increased or decreased according to the situation, and change methods that would be readily conceived by any person skilled in the art within the scope of the technology disclosed in the present disclosure should be within the scope of protection of the present disclosure and thus will not be described herein.

A person skilled in the art may clearly understand that for the sake of convenience and conciseness in description, the process in the above method embodiment may make reference to a specific operation process in the foregoing device embodiment and is not further described here.

In summary, in the manufacturing method for the display substrate of the electronic ink screen according to the embodiment of the present disclosure, the photoelectric conversion device is added to the display substrate of the electronic ink screen, and the photoelectric conversion device may convert the optical signal of ambient light, which is irradiated onto the electronic ink screen, to the electrical signal, thereby supplying power to the driving circuit of the electronic ink screen. Therefore, the photoelectric conversion device may achieve power supply to the electronic ink screen, thereby enriching the function of the electronic ink screen.

Other embodiments of the present disclosure may be derived by those skilled in the art upon consideration of the specification and practice of the invention disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

Understandably, this disclosure is not limited to the precise constructions described above and shown in the enclosed drawings, and various modifications and changes may be made without departing from the scope thereof. The scope of the present disclosure is subject to the appended claims.

What is claimed is:

1. A display substrate of an electronic ink screen, comprising:
    a base substrate having a display region and a non-display region;
    a display structure disposed in the display region of the base substrate; and
    a photoelectric conversion device disposed in the non-display region of the base substrate, wherein the photoelectric conversion device is connected to a driving circuit of the electronic ink screen and is configured to convert an optical signal to an electrical signal so as to supply power to the driving circuit of the electronic ink screen,
    wherein the photoelectric conversion device comprises a plurality of photodiodes connected to the driving circuit and arranged on at least one side of the display region, wherein the plurality of photodiodes are arranged in the non-display region on three sides of the display region except a side where a bonding region is disposed in the non-display region, wherein the bonding region is a region located on a side of the display region, and
    wherein the display substrate further comprises:
        a switch unit disposed in the non-display region of the base substrate, wherein the photoelectric conversion device is connected to an electrical signal input terminal of the switch unit, an electrical signal output terminal of the switch unit is connected to an electrical signal input terminal of the driving circuit, the switch unit is configured to transmit an electrical signal generated by the photoelectric conversion device to the electrical signal input terminal of the driving circuit when being turned on, and the switch unit is a thin film transistor (TFT); and
        a storage battery disposed in the non-display region of the base substrate, wherein the electrical signal output terminal of the switch unit is connected to an electrical signal input terminal of the storage battery, and an electrical signal output terminal of the storage battery is connected to the electrical signal input terminal of the driving circuit.

2. The display substrate according to claim 1, wherein the photodiode is a p-i-n junction photodiode and the p-i-n junction photodiode comprises a first electrode layer, a p-i-n junction and a second electrode layer.

3. The display substrate according to claim 2, wherein the first electrode layer, the p-i-n junction and the second electrode layer are sequentially arranged in a direction distal from the base substrate.

4. The display substrate according to claim 2, wherein the display structure comprises a first gate, a first source, a first drain, and a first transparent pixel electrode; wherein
    the first electrode layer, the first source and the first drain are disposed on the same layer and are made of the same material; and
    the second electrode layer and the first pixel electrode are disposed on the same layer and are made of the same material.

5. The display substrate according to claim 1, wherein the display substrate comprises one switch unit, wherein the plurality of photodiodes are connected in series and connected to the switch unit.

6. The display substrate according to claim 1, wherein the display substrate comprises one switch unit, wherein the plurality of photodiodes are connected in parallel and connected to the switch unit.

7. The display substrate according to claim 1, the display substrate comprises a plurality of switch units, wherein the plurality of switch units are connected to the plurality of photodiodes respectively.

8. The display substrate according to claim 1, wherein the TFT has a second source and a second drain, wherein the second source is connected to an electrical signal output terminal of the photoelectric conversion device, and the second drain is connected to the driving circuit; and the display substrate further comprises a gate line connected to a second gate, wherein the gate line is configured to input a switch control signal to the second gate.

9. The display substrate according to claim 1, further comprising: a photoelectric conversion device conducting-wire layer disposed on the side, distal from the base substrate, of the photoelectric conversion device; wherein
    the photoelectric conversion device conducting-wire layer comprises a plurality of conducting wires and a light-shielding block, wherein the plurality of conducting wires are connected to the plurality of photodiodes in a one-to-one corresponding fashion, and an orthographic projection of the light-shielding block on the base substrate at least partially overlaps an orthographic projection of the switch unit on the base substrate.

10. The display substrate according to claim 1, further comprising a light intensity sensor configured to detect the intensity of ambient light.

11. The display substrate according to claim 10, wherein the light intensity sensor is integrated in the photoelectric conversion device.

12. The display substrate according to claim 1, wherein
the photodiode is a p-i-n junction photodiode which comprises a first electrode layer, a p-i-n junction and a second electrode layer, wherein the first electrode layer, the p-i-n junction and the second electrode layer are sequentially arranged in a direction distal from the base substrate; the display structure comprises a first gate, a first source, a first drain, and a first transparent pixel electrode, wherein the first electrode layer, the first source and the first drain are disposed on the same layer and are made of the same material, and the second electrode layer and the first pixel electrode are disposed on the same layer and are made of the same material;
the TFT has a second source and a second drain, wherein the second source is connected to the photoelectric conversion device, and the second drain is connected to the driving circuit;
the display substrate further comprises a photoelectric conversion device conducting-wire layer disposed on the side, distal from the base substrate, of the photoelectric conversion device, wherein the photoelectric conversion device conducting-wire layer comprises a plurality of conducting wires and a light-shielding block, the plurality of conducting wires being connected to the plurality of photodiodes in a one-to-one corresponding fashion, and an orthographic projection of the light-shielding block on the base substrate at least partially overlapping an orthographic projection of the switch unit on the base substrate;
the display substrate further comprises a light intensity sensor integrated into the photoelectric conversion device, wherein the light intensity sensor is configured to detect the intensity of ambient light; and
the display substrate satisfies any one of the following conditions:
the display substrate comprises one switch unit, and the plurality of photodiodes are connected in series and connected to the switch unit;
the display substrate comprises one switch unit, and the plurality of photodiodes are connected in parallel and connected to the switch unit; and
the display substrate comprises a plurality of switch units, and the plurality of switch units are connected to the plurality of photodiodes respectively.

13. A display device, comprising an electronic ink screen having a display substrate, and a driving circuit of the electronic ink screen, wherein the display substrate comprises:
a base substrate having a display region and a non-display region;
a display structure disposed in the display region of the base substrate; and
a photoelectric conversion device disposed in the non-display region of the base substrate, wherein the photoelectric conversion device is connected to the driving circuit and is configured to convert an optical signal to an electrical signal so as to supply power to the driving circuit,
wherein the photoelectric conversion device comprises a plurality of photodiodes connected to the driving circuit and arranged on at least one side of the display region, wherein the plurality of photodiodes are arranged in the non-display region on three sides of the display region except a side where a bonding region is disposed in the non-display region, wherein the bonding region is a region located on a side of the display region, and
wherein the display substrate further comprises:
a switch unit disposed in the non-display region of the base substrate, wherein the photoelectric conversion device is connected to an electrical signal input terminal of the switch unit, an electrical signal output terminal of the switch unit is connected to an electrical signal input terminal of the driving circuit, the switch unit is configured to transmit an electrical signal generated by the photoelectric conversion device to the electrical signal input terminal of the driving circuit when being turned on, and the switch unit is a thin film transistor (TFT); and
a storage battery disposed in the non-display region of the base substrate, wherein the electrical signal output terminal of the switch unit is connected to an electrical signal input terminal of the storage battery, and an electrical signal output terminal of the storage battery is connected to the electrical signal input terminal of the driving circuit.

14. The display device according to claim 13, further comprising: a housing disposed outside the electronic ink screen, wherein the housing comprises an opening region, the display region of the electronic ink screen is exposed from the opening, and a region, which covers the non-display region of the electronic ink screen, in the housing is light transmissive.

15. A display device according to claim 13, wherein the display device is an electronic price tag.

16. The display device according to claim 13, wherein the photodiode is a p-i-n junction photodiode and the p-i-n junction photodiode comprises a first electrode layer, a p-i-n junction and a second electrode layer.

17. The display device according to claim 16, wherein the first electrode layer, the p-i-n junction and the second electrode layer are sequentially arranged in a direction distal from the base substrate.

18. The display device according to claim 13, wherein the display substrate comprises one switch unit, wherein the plurality of photodiodes are connected in series and connected to the switch unit.

19. The display device according to claim 13, wherein the display substrate comprises one switch unit, wherein the plurality of photodiodes are connected in parallel and connected to the switch unit.

20. The display device according to claim 13, wherein the display substrate comprises a plurality of switch units, wherein the plurality of switch units are connected to the plurality of photodiodes respectively.

* * * * *